US006636478B1

United States Patent
Sensel et al.

(10) Patent No.: US 6,636,478 B1
(45) Date of Patent: Oct. 21, 2003

(54) CONFIGURABLE SCALABLE COMMUNICATIONS EQUIPMENT PROTECTION METHOD SYSTEM

(75) Inventors: Steven Dale Sensel, Blue Ridge, TX (US); David Allen Hamblin, Allen, TX (US); Timothy Albert Carey, Wylie, TX (US)

(73) Assignee: Metro Optix, Inc., Allen, TX (US)

( * ) Notice: Subject to any disclaimer, the term of this patent is extended or adjusted under 35 U.S.C. 154(b) by 0 days.

(21) Appl. No.: 09/563,518

(22) Filed: May 3, 2000

(51) Int. Cl.[7] .................................................. H04L 1/00
(52) U.S. Cl. ........................ 370/216; 370/254; 370/359; 370/419; 714/4
(58) Field of Search ................................ 370/216, 217, 370/218, 254, 359, 419; 714/1, 2, 3, 4

(56) References Cited

U.S. PATENT DOCUMENTS

| | | | |
|---|---|---|---|
| 4,559,421 A | 12/1985 | Lapke | |
| 5,335,105 A | 8/1994 | Carlton | |
| 5,365,510 A | 11/1994 | Nicholson | |
| 5,790,518 A | * 8/1998 | Nguyen et al. | 370/217 |
| 6,038,211 A | * 3/2000 | Lemaire | 370/216 |
| 6,223,149 B1 | * 4/2001 | Margukis et al. | 703/27 |
| 6,256,291 B1 | * 7/2001 | Araki | 370/216 |
| 6,308,282 B1 | * 10/2001 | Huang et al. | 714/4 |
| 6,330,221 B1 | * 12/2001 | Gomez | 370/217 |
| 6,353,593 B1 | * 3/2002 | Chen et al. | 370/216 |

* cited by examiner

Primary Examiner—Alpus H. Hsu
Assistant Examiner—Roberta Stevens
(74) Attorney, Agent, or Firm—Robert H. Frantz

(57) ABSTRACT

A method and system for configurable and scalable line interface card protection or redundancy useful for a range of low speed digital to high speed digital and optical signal types such as STS-1, STS-3, VT1.5, DS-1/T1, DS-3/T3, ATM, ADSL, HDSL, OC-1, OC-3, OC-12, OC-48, OC-192, OC-768, STM-1, STM-4, STM-16, STM-64, E1, E3, J1, J2, and EtherNet and Token Ring LAN signals. A daisy-chain alternate signal path, signal selectors, and alternate front panel entry points are provided to a front-access telecommunications shelf system. Signal interface cards can be designated as primary cards to handle traffic under normal conditions, or as protection cards, without hardware constrained or slot-specific card requirements. Variations of 1:N protection, and multiple groups of 1:N configurations and partitions can be defined without changes to cabling or backplane design variations through setting of relays and signal selectors on each card. As such, any signal present on a cable connected to a primary card may be re-routed to any card designated as a protection card, by first routing the signal through a protection relay on the failed card to a cable to a neighboring card, through a data selector on the neighboring card onto the backplane, and to a selected protection card.

34 Claims, 5 Drawing Sheets

Prior Art

CONFIGURABLE SCALABLE COMMUNICATIONS EQUIPMENT PROTECTION METHOD SYSTEM

CROSS-REFERENCE TO RELATED APPLICATIONS

(CLAIMING BENEFIT UNDER 35 U.S.C. 120)

This application is related to U.S. application Ser. No. 09/563,576 (to be amended to include serial number when it has been assigned), filed on May 3, 2000, by Steven Dale Sensel, et al.

TECHNICAL FIELD OF THE INVENTION

This invention pertains to the arts of high speed data and digital telephony interconnect, wiring, termination, and routing technologies, especially those technologies related to provision of redundant, switch-over, back-up or protection of critical interconnects.

FEDERALLY SPONSORED RESEARCH AND DEVELOPMENT STATEMENT

This invention was not developed in conjunction with any Federally-sponsored contract.

INCORPORATION BY REFERENCE

The related application, docket number, filed on May 3, 2000, by Steven Dale Sensel, et al, is incorporated herein by reference in its entirety, including drawings, and is hereby made a part of this application.

BACKGROUND OF THE INVENTION

High speed data and digital telelphony interconnection schemes are well-known within the art of data and telecommunications, including multi-megabit to gigabit-per-second data rates such as North American transmission standards including STS-1 electrical, STS-3 electrical, VT1.5 electrical, DS-1/T1, DS-3/T3, 25M asynchronous transfer mode ("ATM"), asynchronous digital subscriber line ("ADSL"), high-speed digital subscriber line ("HDSL"), and optical media such as OC-1, OC-3, OC-12, OC-48, OC-192, OC-768; international optical standard media such as synchronous digital hierarchy ("SDH") STM-1, STM-4, STM-16, and STM-64; various standards from the European Telecommunications Standards Institute ("ETSI") and the International Telecommunications Union ("ITU") E1 and E3; Japanese standards including J1 and J2; and local area network ("LAN") interfaces and transmission protocols such as EtherNet, Fast EtherNet, Giga-bit EtherNet, and Token Ring.

Because of the transmission line characteristic and signal integrity considerations necessary to successfully route and interconnect signals of these frequencies, great care must be taken to avoid termination impedance mismatches, unnecessary stubs, and cross talk. Most cabling and connectors used in these installations are either twisted-pair and/or shielded designs.

Most telecommunications switching and data routing systems (10) are organized into "shelves" (11) of cards (12), each card having a particular function in the overall system, as shown in FIG. 1. For example, it is common to have line interface cards which interface to a particular type of media, such as STS-1 or DS3, and to have a shelf processor card which controls and coordinates the functions of the line interface cards. The cards typically install from the "front panel" of the rack in which the shelves are installed, and mate to a backplane towards the rear of the shelf. The backplane provides power distribution as well as functional interconnects such as switching busses, data and address busses, and specialized control and status signals. System architectures such as this are well-known within the art.

In order to provide for greater reliability of a shelf or system, many systems include backup or "protection" cards or card slots. These cards are typically idle and kept on-line as spare cards for use in the event a primary card fails. In a one-for-one protection scheme ("1:1"), each functional card has a paired protection card. So, if a shelf contains 4 DS-3 interface cards, there would be 4 protection DS-3 cards. In a one-for-"N" ("1:N") protection scheme, there are more active or primary cards than protection cards. For example, if there are 4 active DS-3 interface cards and a single protection DS-3 card in a shelf, it is called a 1:4 protection scheme.

Routing of the signal to the protection card or cards is also provided in several convention ways. In many systems, the signal cables, such as DS-3 coax cables or twisted pair cables, connect to the system on the back side of the backplane or to small cards installed from the back panel. This is called "back panel" access. In such a case, the signals are usually routed to the protection card or cards and the primary card slots on the backplane itself, providing a 2-for-1 split for 1:1 protection schemes, or a many-for-1 bussing arrangement for a 1:N protection scheme.

In other systems, front panel access is required, such that signal cables (13) are connected to the front edge of the line interface cards, as shown in FIG. 1. While this access arrangement is preferred by many telephone operating companies, it is actually required under certain national and regional telecommunications norms such as those promulgated by the European Telecommunications Standards Institute ("ETSI"). Re-routing of the signal from the front panel connection to a failed or out-of-service card to a protection card presents particular obstacles in this case. Some systems have simply make connection to the backplane through a passive extender card, but this is not an optimal solution as one card slot is dedicated to this interconnect card and functionality for that slot is lost.

Additionally, systems are typically designed for a certain protection scheme, such as 1:1 or 1:4, etc., and the slots in the shelf are specialized to house primary cards and protection cards because the backplane may be "hardwired" to create a given shelf topology. This restricts the use of the shelf for alternate applications, and thus reduces the number of installations in which a particular shelf design may be deployed. This drives a need for a variety of shelf topologies, which increases production and maintenance costs. For example, a shelf that provides DS-3 switching may have one version which supports 1:1 protection such that half of the cards in the shelf are primary cards and half of the cards are protection cards. This particular shelf would be useful for installations in environments where the traffic carried on the DS-3 links is very critical, such as switch rooms for emergency services. However, for installations into switch rooms for low-cost long distance service providers, the 50% unused functionality may be unacceptable. These low-cost long distance service providers may prefer a 1:8 protection scheme in their shelves, allowing for 8 primary DS-3 interface cards carrying active traffic, with 1 protection card on standby. But, the shelf which provides 1:1 protection cannot be deployed for the 1:8 use, and vice versa.

Therefor, there is a need in the art for a telecommunications interconnect method and system which allows for configuration and re-configuration of the protection scheme. This system must allow the protection scheme to be useful for high-speed as well as low speed data applications to meet the demands of the wide array of telecommunications "physical layers" (e.g. DS-1, E1, DS-3, STS-1, OC-1, etc.). Further, it is preferable that this system and method provide front panel connectivity without dedication of card slots for interconnect of signals to the backplane. Additionally, it is preferable that the protection scheme be compatible with the cabling scheme of the related application, but not be dependent upon this cabling scheme for realization of the invention.

SUMMARY OF THE INVENTION

The present invention is useful for data and telecommunications signals at all speeds and frequencies in the electrical domain, and also for signals in the optical domain, including including multi-megabit to gigabit-per-second data rates such as North American transmission standards including STS-1 electrical, STS-3 electrical, VT1.5 electrical, DS-1/T1, DS-3/T3, 25M asynchronous transfer mode ("ATM"), asynchronous digital subscriber line ("ADSL"), high-speed digital subscriber line ("HDSL"), and optical media such as OC-1, OC-3, OC-12, OC-48, OC-192, OC-768; international optical standard media such as synchronous digital hierarchy ("SDH") STM-1, STM-4, STM-16, and STM-64; various standards from the European Telecommunications Standards Institute ("ETSI") and the International Telecommunications Union ("ITU") E1 and E3; Japanese standards including J1 and J2; and local area network ("LAN") interfaces and transmission protocols such as EtherNet, Fast EtherNet, Giga-bit EtherNet, and Token Ring. A daisy-chain alternate signal path, signal selectors, and alternate front panel entry points are provided to a front-access telecommunications shelf system. Cards can be designated as primary cards to handle traffic under normal conditions, or as protection cards, without hardware constrained or slot-specific card requirements. Variations of 1:N protection, and multiple groups of 1:N configurations and partitions can be defined without changes to cabling or backplane design variations through setting of relays and signal selectors on each card. As such, any signal present on a cable connected to a primary card may be re-routed to any card designated as a protection card, by first routing the signal through a protection relay on the failed card to a cable to a neighboring card, through a data selector on the neighboring card onto the backplane, and to a selected protection card.

BRIEF DESCRIPTION OF THE DRAWINGS

The figures presented herein when taken in conjunction with the disclosure form a complete description of the invention, wherein elements and steps indicated by like reference indicators are the same or equivalent elements or steps.

DETAILED DESCRIPTION OF THE INVENTION

The invention presented herein is useful for systems involving low-speed signals, such as DS-1 and E1 at the mega-bit-per-second rates, as well as multi-Megabit-per-second rate signals such as DS3 and STS-1 and Gigabit data rates. The interconnection system and method disclosed for routing and re-routing of the signals to protection cards maintains signal termination impedance throughout the process of switch over to the protection terminator and switch back to the primary terminator, with all access to cabling and/or fibers and cards being available to the front panel of the equipment shelf.

The invention is equally applicable to a wide range of electrical and optical transmission media types, including multi-megabit to gigabit-per-second data rates such as North American transmission standards including STS-1 electrical, STS-3 electrical, VT1.5 electrical, DS-1/T1, DS-3/T3, 25M asynchronous transfer mode ("ATM"), asynchronous digital subscriber line ("ADSL"), high-speed digital subscriber line ("HDSL"), and optical media such as OC-1, OC-3, OC-12, OC-48, OC-192, OC-768; international optical standard media such as synchronous digital hierarchy ("SDH") STM-1, STM-4, STM-16, and STM-64; various standards from the European Telecommunications Standards Institute ("ETSI") and the International Telecommunications Union ("ITU") E1 and E3; Japanese standards including J1 and J2; and local area network ("LAN") interfaces and transmission protocols such as EtherNet, Fast EtherNet, Giga-bit EtherNet, and Token Ring, as will be readily recognized by those killed in the art.

At higher data rates, such as DS-3 and above, maintaining signal integrity and a constant transmission impedance is critical—even during switch over and switch back between a primary terminator card and a protection or backup terminator card. As such, typical "Y" cabling schemes are not adequate.

Figure 1:
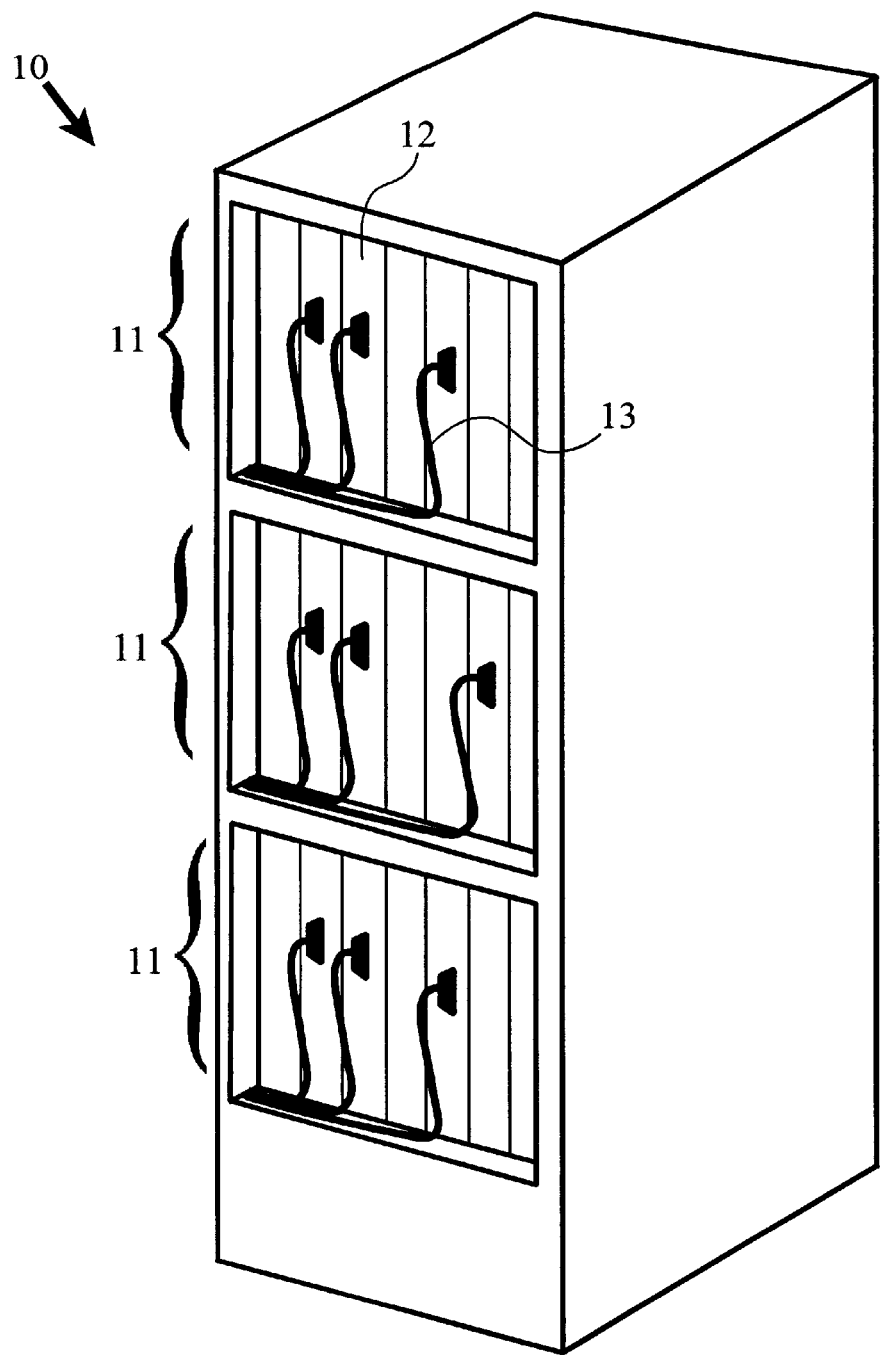
FIG. 1 presents the general mechanical organization of typical high-speed data and digital telephony systems including signal cables, cards, and backplane in a shelf.
Figure 2:
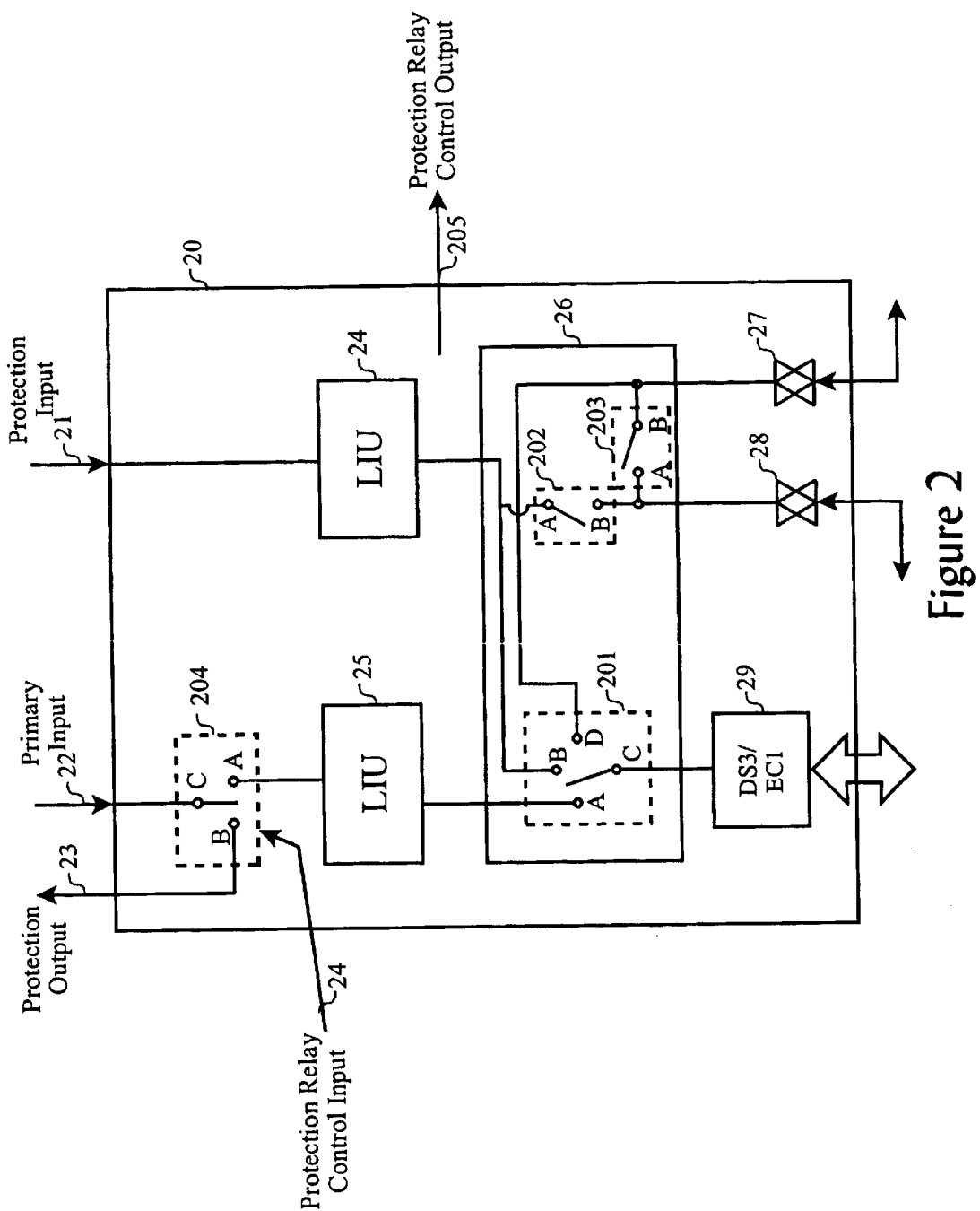
FIG. 2 shows the internal signal routing of the line interface or "TRIB" card of the preferred embodiment.

Turning to FIG. 2, the signal routing plan of the line interface or tributary ("TRIB") card (20) is shown. The TRIB card is provided with a normal or primary input (22), which consists of transmit and receive signal pairs interfaced to an appropriate connector, such as a 75 Ohm coax connector for DS-3 signals. In the preferred embodiment, the cabling interconnect scheme disclosed in the related application is used in conjunction with the current method and system, but the current method and system is not dependent on use of this cabling scheme. The primary input (22) is routed by a protection relay (204) to either a line interface unit (25), such as a DS-3 LIU, or to a protection output (23). The protection relay (204) is controlled by a relay control input (24). Under the cabling scheme of the related application, this protection output is cabled to a neighboring card which serves as an alternate physical connection point for the signal cable while the primary card is being removed and replaced. The LIU (25) is interfaced to a signal selector (26) as shown. The signal selector allows the signal at the primary input to be routed to a signal processing function (29) such as DS3 terminator circuit using a one-of-three selector (201) or relay. The signal processing function (29) also interfaces to the backplane (200) for routing channel data onto and off of the backplane bus. Logic on the card also provides for state setting of a protection relay control output (205), such as an addressable register accessible to a shelf processor card via the backplane, or by error detection hardware and software resident on the TRIB card.

Continuing with FIG. 2, it is shown that the TRIB card (20) is provided with a protection input (21) for interconnect to an alternate signal source, such as a cable from the protection output of a neighboring TRIB card as disclosed in the related application. The protection input consists of a transmit signal output and receive signal input, such as a DS3 transmit pair and receive pair. This signal is electrically terminated by a protection LIU (24), which also interfaces to the signal selector (26) as shown. The signal selector (26) provides for routing of the protection signal from the protection input to the signal processing function (29) via the one-of-three selector (201), or to a first backplane transceiver (28) via a protection-to-backplane relay (202). A backplane loopback relay (203) is provided in the signal selector (26) to route signals from the first backplane transceiver to a second backplane transceiver, the purpose of which is explained in detail infra.

So, under normal conditions when this card is acting as a primary TRIB card (not a protection card), the protection relay (204) routes the signal from the primary input (22) to the primary LIU (25) through the signal selector (26) to the signal processing function (29). The loopback relay (203) of the signal selector (26) is closed to provide a "through path" between the two backplane transceivers (28 and 27). During card replacement of this card as a primary TRIB card, the primary input (22) is routed through the protection relay (204) to the protection output (23).

During operation of this card as a protection card, the signal present at the protection input (21) is routed through the protection LIU (24) to the signal selector, and through the signal selector to either the signal processing function (29) or to the first backplane transceiver (28).

Figure 3:
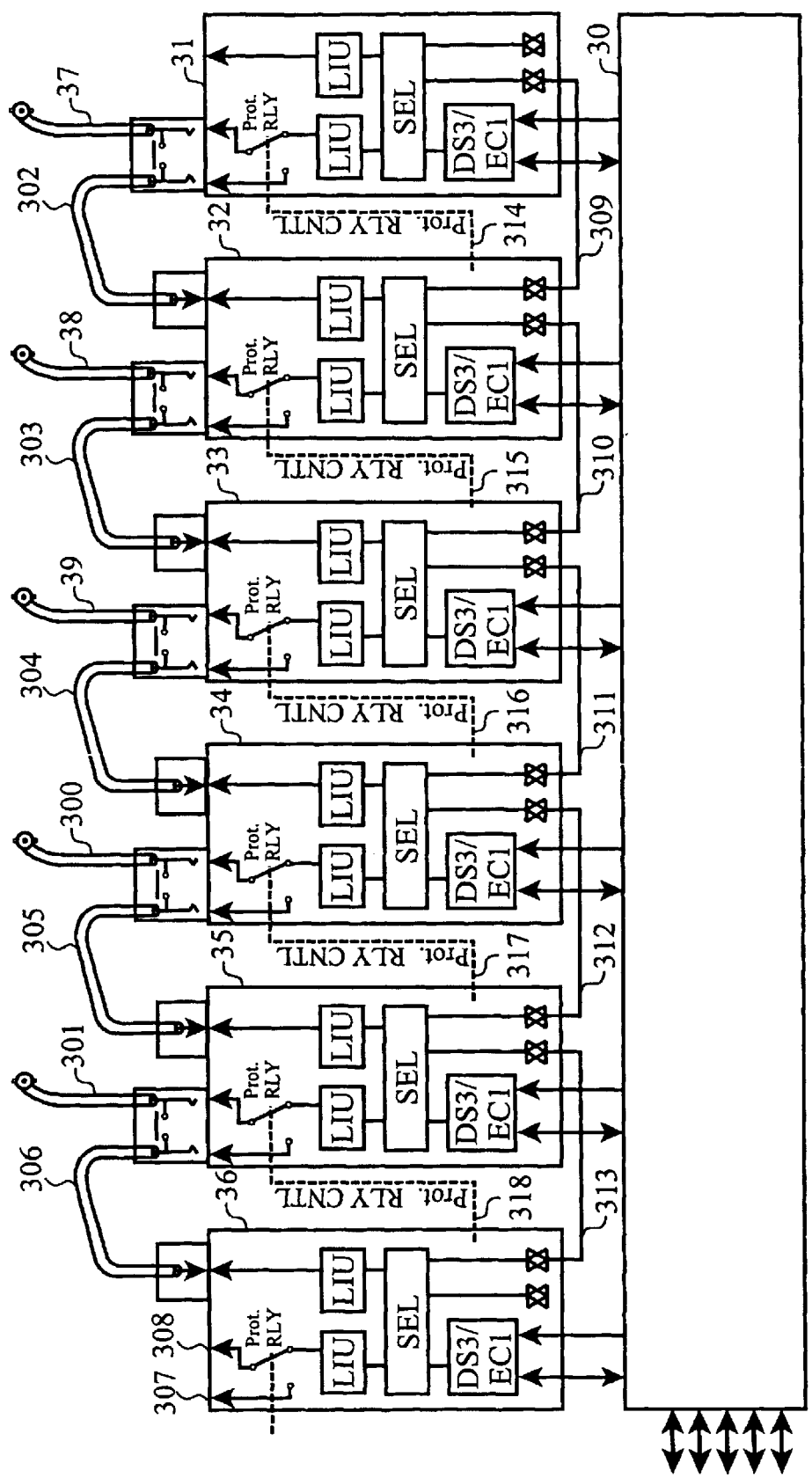
FIG. 3 depicts the shelf architecture achieved when several of the cards of FIG. 2 are assembled and interconnected in an equipment shelf by a backplane.

Turning to FIG. 3, the implications and usefulness of this card switching and routing architecture is more apparent. A shelf utilizing six of the TRIB cards incorporating the present invention are shown interconnected by a backplane (30). This example shows a 1:5 protection scheme, whereby cards 31 through 35 are primary, active TRIB cards, and card 36 is acting as the protection card. Under the cabling and interconnect method of the related application, each signal cable (37 through 39, 300 and 301) is provided with a connector to the primary signal input and protection signal output of each active card, as shown. A pig tail section of each signal cable provides signal route from the protection output of a TRIB card to the protection input of a neighboring card. The protection card receives only a pigtail connection from the neighboring TRIB card, and has no connection to a cable at its primary signal input.

On the backplane (30), the first backplane transceiver of each card is interconnected to the second backplane transceiver of each card, to form a daisy chain which weaves through the backplane and the cards, as shown by interconnects 309, 310, 311, 312, and 313. The backplane also provides interconnect for each of the card's protection relay control output to a neighboring card's protection relay control input, shown as interconnects 314, 315, 316, 317, and 318.

The arrangement of the cards and interconnection of signals as disclosed in FIG. 3 can be expanded to greater than 1:5 or less than 1:5 protection without departing from the spirit and scope of the present invention. In fact, as is demonstrated infra, this scalability is one of the claimed features and advantages of the invention.

Continuing with the example of FIG. 3, each of the primary signals arriving on cables 37 through 39, 300 and 301 are routed "normally" through the protection relay to the primary LIU, through the signal selector to the signal processing function on each of the primary active cards. Channels and/or data from the signals are switched or routed to the backplane for further handling within the shelf or transmission to other shelves. During "normal" operation, the protection card (36) is not active but may be in stand-by mode.

Figure 4:
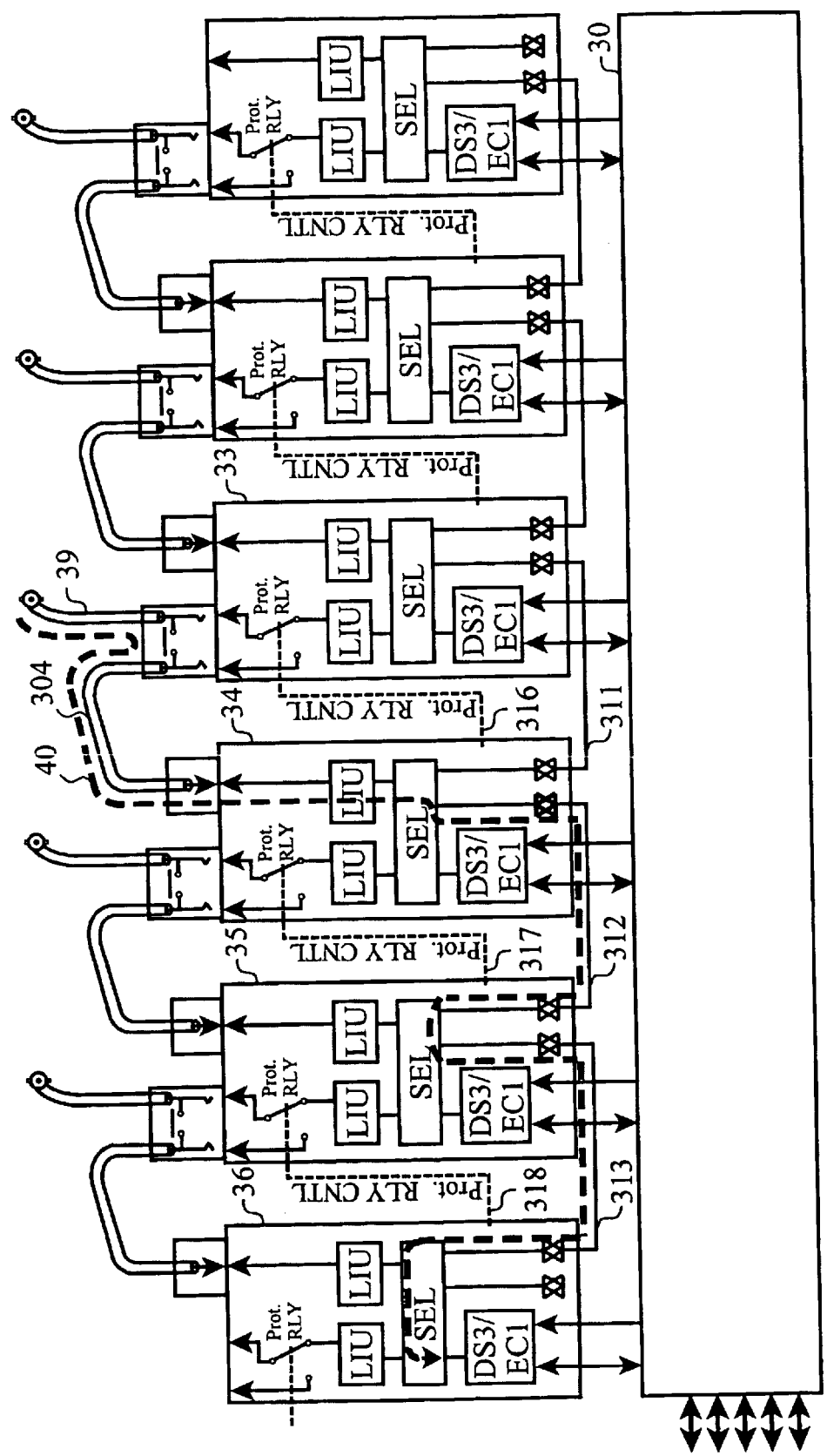
FIG. 4 shows in detail the operation of the relays and signal selectors to achieve an alternate signal routing path from a failed primary card to a protection card.

When any of the primary cards fails or is otherwise taken out of service, the primary signal to that card may be routed to the protection card, as is demonstrated in FIG. 4. In this example, the third card from the right (33) is failed or taken out of service. It's protection relay control (316) is activated by it's neighboring card (34), and the data selector on the neighboring card (34) is set to route the protection signal input to the first backplane transceiver. On the protection card (36), the signal selector is set to route the second backplane transceiver to the on-board signal processing function. The backplane loopback relays of the signal selectors are closed on all of the cards in between the neighboring card (34) and the protection card, namely in this example card 35. Thus, the primary signal which was being terminated and handled by the failed card, present on signal cable 39, is routed through the protection relay on the failed card, to the protection input of the neighboring card, to the neighbor's protection LIU, to the neighbor's signal selector and onto the backplane, through the intervening card's (35) signal selector, to the backplane again, and into the protection card's signal selector and finally to the protection card's signal processing function, as shown by the dotted line (40). It can be seen that using this method, the primary signal from any of the primary TRIB cards can be routed to the protection card without cable changes or movement.

The failed card can then be removed and replaced without interruption to the handling of the primary signal, as is discussed in the related application using the preferred make-before-break cabling and interconnect method. Without use of the cabling and interconnect method described in the related application, the signal can continue to be handled by the protection card until such time as an interruption of service is tolerable.

Figure 5:
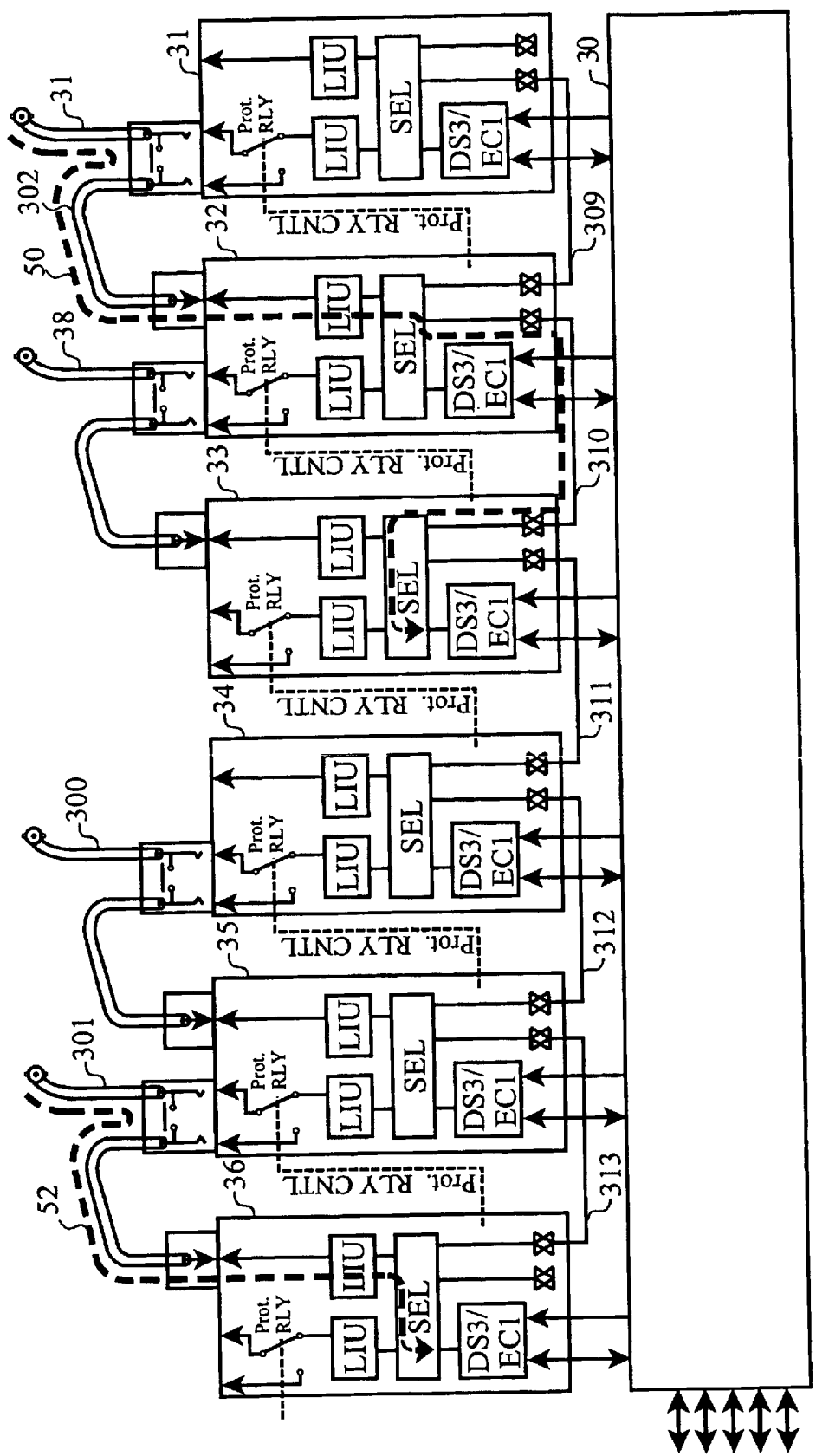
FIG. 5 illustrates another configuration of the shelf partitioned into two groups of cards, each group having its own protection card.

Turning to FIG. 5, another advantage and feature of the present invention is demonstrated. The interconnection scheme previously disclosed also supports partitioning of the shelf into groups of 1:N protection, all the way down to groups of 1:1 protection, without the need for cabling changes or backplane modifications or variants. The particular example shown in FIG. 5 partitions the TRIB cards into two groups of three cards, each having a 1:2 protection scheme. For example, card 33 serves as the protection card for cards 31 and 32, and card 36 serves as the protection card for cards 34 and 35. In this partitioning, all the signal routing of the previous 1:5 example is applied to each group separately, with the only exception being that the backplane loopback relay of card 34 is left in an open state. This creates two separate daisy-chains of the signal through the backplane for each group. Thus, by way of example, the primary signal present on cable 37 can be routed through the protection relay on card 31 to its protection output, into the protection LIU of the neighboring card 32, to the backplane, and through the signal selector on the group's protection card (33) to its signal processing function, as shown by the dotted line (50). As shown by dotted line (52), the primary signal from a card immediately adjacent to the protection card does not traverse the backplane, but is only received at the protection card's protection input and routed through the protection card's signal selector to the signal processing function on the protection card.

As all of the protection relays and signal selectors on the TRIB cards are preferably placed under software control, such as software running on a processor on a shelf processor card or software running on a remote processor, the shelf can be reconfigured during operation, or "on the fly".

A further advantage and feature of the invention is that the shelf can be broken into asymmetrical groupings. For example, for a shelf with a total of 6 card slots, one group of 1:3 protection and another group of 1:1 can be established, and as just described, this can be updated throughout run time or operation as the nature of the traffic on the primary cables changes.

While the disclosure contained herein has set forth a preferred embodiment of the invention, and the fundamental components used within the invention are well-known within the art, it will be appreciated by those who are skilled in the art that variations to the combination of elements and steps disclosed can be made without departing from the scope and spirit of the invention. Such variations may include, but are not limited to, selection of alternate cable types, connector types, and relays or signal selectors, to enable the invention to be useful for high-rate electrical signals as well as optical signals. Therefore, the scope of the claimed invention should be determined by the following claims.

What is claimed is:

1. A method for interconnecting and configuring a plurality of communications interface devices for signal protection and redundancy of service, said method comprising the steps of:

providing each communications interface device with:
(a) a bi-directional protection signal connector for communicably receiving and transmitting a communications signal;
(b) a protection line interface unit (LIU) for bi-directionally terminating a signal present at said protection signal connector, said protection LIU terminating said present signal at a physical layer, and said protection LIU having a bi-directional logic-level port;
(c) a communications signal processing unit suitable for interfacing to a bi-directional logic-level communications signal and terminating said signal, each signal processing unit having a signal processing signal port;
(d) a first bi-directional logic-level connector and a second bi-directional logic-level connector;
(e) a first signal relay disposed between said protection LIU logic-level port and said first logic-level connector such that said logic-level port of said protection LIU may be communicably and selectively connected to said first logic-level connector;
(f) a second signal relay disposed between said second logic-level connector and said first logic-level connector such that logic-level signals may be communicably and selectively connected between the first and second logic-level connectors;
(g) a third signal relay disposed between said second logic-level connector and said signal processing signal port such that logic-level signals may be communicably and selectively connected between said second logic-level connector and said signal processing unit for termination;

forming a daisy-chain signal arrangement among said plurality of communications interface devices by providing a plurality of logic-level interconnects between a first logic-level connector of each communications interface device and a second logic-level connector of another communications interface device; and configuring and controlling said first, second and third signal relays on each of said communications interface devices to establish one of at least three interconnection modes on each of the communications interface devices:
(h) routing of a signal present at a device's protection signal connector through the device's protection LIU, through the device's first relay to the device's first logic-level interconnect (route to daisy-chain mode),
(i) routing of a signal between said first logic-level connector and said second logic-level connector (through-mode), and
(j) routing of a signal present at said second logic-level interconnect to said signal processing unit for termination (daisy-chain terminator mode), such that at least one of the communications interface devices may be configured in "route to daisy-chain mode", at least one of the communications interface devices may be configured in "daisy-chain terminator mode", and all communications interface devices positioned in the daisy-chain between these two communications interface devices may be configured in "through mode", thereby achieving a selectable bidirectional interconnect of a signal from any protection connector on any of the communications interface devices to any signal processing unit on any other communications interface device.

2. A method for interconnecting and configuring a plurality of communications interface devices for signal protection and redundancy of service as set forth in claim 1 wherein said protection line interface units (LIUs) are adapted for physical-layer termination of electrical communications signals.

3. A method for interconnecting and configuring a plurality of communications interface devices for signal protection and redundancy of service as set forth in claim 2 wherein said protection line interface units (LIUs) are adapted for physical-layer termination of DS-1/T1 electrical communications signals.

4. A method for interconnecting and configuring a plurality of communications interface devices for signal protection and redundancy of service as set forth in claim 2 wherein said protection line interface units (LIUs) are adapted for physical-layer termination of DS-3/T3 electrical communications signals.

5. A method for interconnecting and configuring a plurality of communications interface devices for signal protection and redundancy of service as set forth in claim 2 wherein said protection line interface units (LIUs) are adapted for physical-layer termination of STS-1 electrical communications signals.

6. A method for interconnecting and configuring a plurality of communications interface devices for signal protection and redundancy of service as set forth in claim 2 wherein said protection line interface units (LIUs) are adapted for physical-layer termination of STS-3 electrical communications signals.

7. A method for interconnecting and configuring a plurality of communications interface devices for signal protection and redundancy of service as set forth in claim 2 wherein said protection line interface units (LIUs) are adapted for physical-layer termination of VT1.5 electrical communications signals.

8. A method for interconnecting and configuring a plurality of communications interface devices for signal protection and redundancy of service as set forth in claim 2 wherein said protection line interface units (LIUs) are adapted for physical-layer termination of 25 Mbs asynchronous transfer mode ("ATM") communications signals.

9. A method for interconnecting and configuring a plurality of communications interface devices for signal protection and redundancy of service as set forth in claim 2 wherein said protection line interface units (LIUs) are adapted for physical-layer termination of asynchronous digital subscriber line ("ADSL") communications signals.

10. A method for interconnecting and configuring a plurality of communications interface devices for signal protection and redundancy of service as set forth in claim 2 wherein said protection line interface units (LIUs) are adapted for physical-layer termination of high-speed digital subscriber line ("HDSL") communications signals.

11. A method for interconnecting and configuring a plurality of communications interface devices for signal protection and redundancy of service as set forth in claim 2 wherein said protection line interface units (LIUs) are adapted for physical-layer termination of International Telecommunications Union ("ITU") E1 communications signals.

12. A method for interconnecting and configuring a plurality of communications interface devices for signal protection and redundancy of service as set forth in claim 2 wherein said protection line interface units (LIUs) are adapted for physical-layer termination of International Telecommunications Union ("ITU") E3 communications signals.

13. A method for interconnecting and configuring a plurality of communications interface devices for signal protection and redundancy of service as set forth in claim 2 wherein said protection line interface units (LIUs) are adapted for physical-layer termination of Japanese J1 communications signals.

14. A method for interconnecting and configuring a plurality of communications interface devices for signal protection and redundancy of service as set forth in claim 2 wherein said protection line interface units (LIUs) are adapted for physical-layer termination of Japanese J2 communications signals.

15. A method for interconnecting and configuring a plurality of communications interface devices for signal protection and redundancy of service as set forth in claim 2 wherein said protection line interface units (LIUs) are adapted for physical-layer termination of local area network ("LAN") communications signals.

16. A method for interconnecting and configuring a plurality of communications interface devices for signal protection and redundancy of service as set forth in claim 15 wherein said protection line interface units (LIUs) are adapted for physical-layer termination of EtherNet LAN communications signals.

17. A method for interconnecting and configuring a plurality of communications interface devices for signal protection and redundancy of service as set forth in claim 15 wherein said protection line interface units (LIUs) are adapted for physical-layer termination of Fast EtherNet LAN communications signals.

18. A method for interconnecting and configuring a plurality of communications interface devices for signal protection and redundancy of service as set forth in claim 15 wherein said protection line interface units (LIUs) are adapted for physical-layer termination of Gigabit EtherNet LAN communications signals.

19. A method for interconnecting and configuring a plurality of communications interface devices for signal protection and redundancy of service as set forth in claim 1 wherein said protection line interface units (LIUs) are adapted for physical-layer termination of optical communications signals.

20. A method for interconnecting and configuring a plurality of communications interface devices for signal protection and redundancy of service as set forth in claim 19 wherein said protection line interface units (LIUs) are adapted for physical-layer termination of OC-1 optical communications signals.

21. A method for interconnecting and configuring a plurality of communications interface devices for signal protection and redundancy of service as set forth in claim 19 wherein said protection line interface units (LIUs) are adapted for physical-layer termination of OC-3 optical communications signals.

22. A method for interconnecting and configuring a plurality of communications interface devices for signal protection and redundancy of service as set forth in claim 19 wherein said protection line interface units (LIUs) are adapted for physical-layer termination of OC-48 optical communications signals.

23. A method for interconnecting and configuring a plurality of communications interface devices for signal protection and redundancy of service as set forth in claim 19 wherein said protection line interface units (LIUs) are adapted for physical-layer termination of OC-12 optical communications signals.

24. A method for interconnecting and configuring a plurality of communications interface devices for signal protection and redundancy of service as set forth in claim 6 wherein said protection line interface units (LIUs) are adapted for physical-layer termination of OC-192 optical communications signals.

25. A method for interconnecting and configuring a plurality of communications interface devices for signal protection and redundancy of service as set forth in claim 6 wherein said protection line interface units (LIUs) are adapted for physical-layer termination of OC-768 optical communications signals.

26. A method for interconnecting and configuring a plurality of communications interface devices for signal protection and redundancy of service as set forth in claim 6 wherein said protection line interface units (LIUs) are adapted for physical-layer termination of synchronous digital hierarchy ("SDH") STM-1 communications signals.

27. A method for interconnecting and configuring a plurality of communications interface devices for signal protection and redundancy of service as set forth in claim 6 wherein said protection line interface units (LIUs) are adapted for physical-layer termination of synchronous digital hierarchy ("SDH") STM-4 communications signals.

28. A method for interconnecting and configuring a plurality of communications interface devices for signal protection and redundancy of service as set forth in claim 6 wherein said protection line interface units (LIUs) are adapted for physical-layer termination of synchronous digital hierarchy ("SDH") STM-16 communications signals.

29. A method for interconnecting and configuring a plurality of communications interface devices for signal protection and redundancy of service as set forth in claim 6 wherein said protection line interface units (LIUs) are adapted for physical-layer termination of synchronous digital hierarchy ("SDH") STM-64 communications signals.

30. A method for interconnecting and configuring a plurality of communications interface devices for signal protection and redundancy of service as set forth in claim 1 wherein said daisy-chain of logic-level interconnects between first and second logic-level connectors is provided in a multi-slot backplane.

31. A method for interconnecting and configuring a plurality of communications interface devices for signal protection and redundancy of service as set forth in claim 1 wherein said daisy-chain of logic-level interconnects between first and second logic-level connectors is provided using electrical cables.

32. A method for interconnecting and configuring a plurality of communications interface devices for signal protection and redundancy of service as set forth in claim 1 further comprising the step of providing each communications interface device with a third signal relay disposed between said protection LIU logic-level port and said signal processing signal port of same said communications interface device such that logic-level signals may be communicably and selectively connected between the protection LIU and the signal processor for termination on same said communications interface device thereby allowing a fourth mode of signal interconnection between a protection connector on a communication interface device, through the protection LIU on the same communication interface device, to the signal processor on the same communication interface device.

33. A method for interconnecting and configuring a plurality of communications interface devices for signal protection and redundancy of service as set forth in claim 32 further comprising the steps of:

providing each communications interface device with:

a primary signal connector, a primary signal LIU having a physical layer signal port and a logic-level port, a controllable protection relay communicably disposed between said primary signal connector and said physical layer signal port of said primary signal LIU, a controllable local signal processor relay communicably disposed between said logic-level port of said primary signal LIU and the logic-level port of the signal processor on the same communications interface device; and configuring and controlling at least one communications interface device to establish a fifth mode of signal interconnection between a signal present at said primary signal connector, through said protection relay to said primary signal LIU, to said signal processor on the same communications interface device.

34. A method for interconnecting and configuring a plurality of communications interface devices for signal protection and redundancy of service as set forth in claim 33 further comprising the steps of:

providing each communications interface device with:

a signal diversion connector, and a second controllable protection relay communicably disposed between said primary connector and said signal diversion connector; and configuring and controlling at least one communications interface device to establish a sixth mode of signal interconnection between said primary signal connector and said signal diversion connector.

* * * * *